United States Patent [19]
Tysk

[11] 3,894,536
[45] July 15, 1975

[54] LUNG VENTILATOR INCLUDING VOLUME METER FOR MEASURING TOTAL VOLUME

[75] Inventor: Jan Erik Tysk, Ekero, Sweden

[73] Assignee: Jungner Instrument AB, Solna, Sweden

[22] Filed: Jan. 24, 1974

[21] Appl. No.: 436,379

[30] Foreign Application Priority Data
Sept. 29, 1973 Sweden .............................. 7301217

[52] U.S. Cl. ......................... 128/145.8; 128/145.8
[51] Int. Cl.² ....................................... A61M 16/00
[58] Field of Search ............ 128/145.8, 145.5, 145.6, 128/145.7, 142.3, 146.5, 188, 203, 211, DIG. 17, 211, 2.05 V; 137/551

[56] References Cited
UNITED STATES PATENTS
2,907,322  10/1959  Hay .................................. 128/145.6
3,256,876  6/1966  Elam ................................ 128/145.8

Primary Examiner—Richard A. Gaudet
Assistant Examiner—Henry J. Recla
Attorney, Agent, or Firm—Haseltine, Lake & Waters

[57] ABSTRACT

A lung ventilator comprising an expiration conduit extending from the patient to a gas volume meter provided for measuring the volume of the gas being discharged from the patient through the expiration conduit during the expiration phase of each respiratory cycle and an expiration valve provided in the expiration conduit between the patient and the gas volume meter and operative to be open during the expiration phase and closed during the inspiration phase of each respiratory cycle. An additional valve is connected to the portion of the expiration conduit between the expiration valve and the gas volume meter and is operative to be open during the inspiration phase of each respiratory cycle so as to put that portion of the expiration conduit in communication with the ambient atmosphere and to be closed during the expiration phase of each respiratory cycle. Hereby, any breathing gas that may leak through the expiration valve during the inspiration phase of a respiratory cycle, will be discharged to the ambient atmosphere through the additional valve instead of being supplied to the gas volume meter.

6 Claims, 1 Drawing Figure

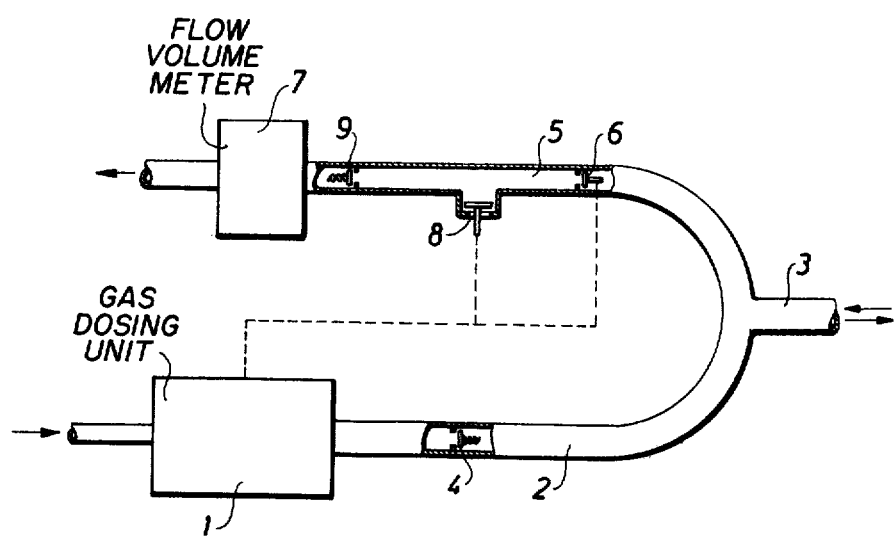

LUNG VENTILATOR INCLUDING VOLUME METER FOR MEASURING TOTAL VOLUME

BACKGROUND OF THE INVENTION

1. Field of the Invention

The present invention relates to lung ventilators of the type comprising an expiration conduit connected to a breathing mask or a similar device adapted to be connected to a patient, an expiration valve provided in said expiration conduit and operative to be open during the expiration phase and closed during the inspiration phase of each respiratory cycle, and a gas volume meter connected to said expiration conduit downstream of said expiration valve for measuring the gas volume being discharged through said expiration conduit.

2. Description of the Prior Art

In lung ventilators it is of course essential that it be possible to check whether the amount of breathing gas that the gas dosing means of the ventilator has been set to deliver, the so called tidal volume, is also actually supplied to the lungs of the patient. A not uncommon source of errors in this respect are leaks between the gas dosing means and the patient. In order to make it possible to check whether the tidal volume that the gas dosing means of the ventilator has been set to deliver, is also actually supplied to the lungs of the patient, it is common practice to provide the lung ventilator with a flow or volume meter for the breathing gas. This meter is generally connected to the expiration conduit from the patient downstream of the expiration valve in the conduit, which valve is controlled so as to be closed during the inspiration phase and open during the expiration phase of each respiratory cycle. The expiration valve is generally controlled from the gas dosing means or its control unit in synchronism with the breathing or respiratory frequency, which may be determined positively by a setting in the lung ventilator or alternatively be at least partially determined or influenced by the patient. Said volume meter measures consequently the gas volume being discharged through the expiration conduit and if it registers a gas volume equal to the gas volume that the gas dosing means of the ventilator is set to deliver, it can be presumed that no leaks exist in the system and that the entire gas volume delivered by the gas dosing means has also actually been supplied to the lungs of the patient. However, this is true only if the expiration valve is actually closed and completely gastight during the inspiration phase. Should for one reason or another the expiration valve leak during the inspiration phase, it is obvious that some of the breathing gas delivered by the gas dosing means will flow directly through the expiration conduit through the leaking expiration valve and the volume meter without having first been supplied to the lungs of the patient. This will not be noticed, as the volume meter, which generally integrates the gas volume being discharged through the expiration conduit over one or several respiratory cycles, will also measure this gas volume leaking through the expiration valve during the inspiration phase, although this gas volume has never been supplied to the lungs of the patient. Consequently, the patient will, if the expiration valve leaks during the inspiration phase, receive a smaller volume of breathing gas than the volume delivered by the gas dosing means of the ventilator and this situation will not be discovered, which may obviously give cause to very serious consequences for the patient.

SUMMARY OF THE INVENTION

An object of the present invention is to provide an improved lung ventilator of the type mentioned in the foregoing, in which the above discussed risks caused by a leaking expiration valve are eliminated.

According to the invention this object is achieved in that an additional valve is connected to the portion of the expiration conduit extending between the expiration valve and the gas volume meter so as to put said portion of the expiration conduit in communication with the ambient atmosphere when the valve is in its open state, said additional valve being controlled to be kept in its open state during the inspiration phase and in its closed state during the expiration phase of each respiratory cycle.

In a lung ventilator according to the invention any breathing gas that may leak through the expiration valve during the inspiration phase will not have the opportunity to pass through the volume meter but will instead be discharged to the ambient atmosphere, whereby the volume meter will measure and register a smaller gas volume than the gas volume delivered by the gas dosing means of the ventilator, which will immediately indicate the presence of a fault in the system.

DESCRIPTION OF A PREFERRED EMBODIMENT

In the following, the invention will be described in further detail with reference to the accompanying drawing, the sole FIGURE of which illustrates schematically and by way of example the general design of a lung ventilator embodying the invention.

The lung ventilator schematically illustrated in the drawing comprises in conventional manner a gas dosing unit 1, which delivers periodically (for each respiratory cycle) a pre-adjustable volume of breathing gas, which is supplied through an inspiration conduit 2 to a patient conduit 3, which is provided with a breathing mask or a similar device (not shown in the drawing) adapted to be connected to the patient. The inspiration conduit 2 includes an inspiration valve 4, which may for example quite simply consist of a check valve and which permits a gas flow only in the direction from the gas dosing unit 1 to the patient conduit 3.

Connected to the patient conduit 3 or the breathing mask or the corresponding device is an expiration conduit 5, which includes an expiration valve 6 and a flow or volume meter 7, which is provided for measuring the volume of the gas being discharged from the patient through the expiration conduit 5. The expiration valve 6 is controlled in any suitable and conventional manner from the gas dosing unit 1 or its control unit so as to be closed during the inspiration phase and open during the expiration phase for each respiratory cycle.

So far as described above, the lung ventilator illustrated in the drawing is of a quite conventional design. It is appreciated that, as long as no leaks exist in the inspiration conduit 2, the expiration conduit 5 and the patient conduit 3 or between the breathing mask or the corresponding device and the patient, the volume meter 7 will measure and register the gas volume delivered by the gas dosing unit 1. If the volume meter 7 registers a gas volume equal to the gas volume delivered by the gas dosing unit 1, one might therefore assume that the gas volume delivered by the gas dosing unit 1 has also without doubt been supplied to the patient.

However, it is realized that this is true only under the condition that the expiration valve 6 is in fact closed and completely gas-tight during the inspiration phase. If, for one reason or another, the expiration valve 6 is not closed or completely gas-tight during the inspiration phase, it is obvious that some of the breathing gas being delivered from the gas dosing unit 1 will be discharged directly through the expiration conduit 5 through the leaking expiration valve 6 and the volume meter 7 without having been supplied to the patient. As, obviously, also this gas volume will be measured by the volume meter 7, this situation would normally not be noticed.

As a remedy of this imperfection, the lung ventilator according to the invention illustrated in the drawing is provided with an additional valve 8, which is disposed in the portion of the expiration conduit 5 between the volume meter 7 and the expiration valve 6 and which is controlled from the gas dosing unit 1 or its control unit so as to be open during the inspiration phase and closed during the expiration phase of each respiratory cycle. As this additional valve 8 is open during the inspiration phase, any breathing gas that may, during the inspiration phase, leak through a leaking expiration valve 6, will be discharged to the ambient atmosphere and consequently not flow through the volume meter 7. Hereby, the volume meter 7 will, in such a case, measure and register a smaller gas volume than the gas volume delivered by the dosing unit 1, whereby it is discovered that a fault is present in the system.

The valve 8 should be controlled in such a manner that it does not open at the beginning of the inspiration phase, until the expiration valve 6 has been closed, and closes at the end of the inspiration phase, before the expiration valve 6 is opened.

If the volume meter 7 is of the type often used in lung ventilators, which accumulates the received gas volume in a container under a low pressure, it is preferable that a valve 9 be provided in the expiration conduit 5 between the volume meter 7 and the valve 8 for preventing the accumulated gas in the volume meter 7 from escaping through the valve 8 when this is open. The valve 9 may, as illustrated schematically in the drawing, in the most simple case consist of a check valve permitting a gas flow only into the volume meter 7. However, the valve 9 can also be a controlled valve, which is controlled from the gas dosing unit 1 or its control unit so as to be opened and closed in synchronism with the expiration valve. In this way it is made still more certain that breathing gas that may, during an inspiration phase, leak through the expiration valve 6, will be discharged to the ambient atmosphere through the open valve 8 and not be supplied to the volume meter 7.

What is claimed is:

1. A lung ventilator comprising a gas dosing unit for delivering periodically predetermined volumes of breathing gas, a patient conduit means an inspiratory gas conduit connecting said dosing unit with said patient conduit means for conveying breathing gas from said dosing unit to a patient during the inspiratory phase of each respiratory cycle, an expiratory gas conduit connected to said patient conduit means for conveying expirated gas from the patient during the expiratory phase of each respiratory cycle, an inspiratory valve means in said inspiratory gas conduit providing a one-way gas flow from said dosing unit to said patient conduit means an expiration valve means in said expiratory gas conduit operated in synchronism with said dosing unit to be open during the expiratory phase and closed during the inspiratory phase of each respiratory cycle, gas volume measuring means connected to said expiratory gas conduit downstream of said expiration valve means for measuring the gas volume being conveyed through said expiratory gas conduit, additional valve means connected to the portion of said expiratory gas conduit extending between said expiration valve means and said gas volume measuring means for putting said portion of the expiratory gas conduit in communication with the ambient atmosphere when said additional valve means is in its open state, and control means operating in synchronism with said dosing unit for keeping said additional valve means in its open state during the inspiratory phase and in its closed state during the expiratory phase of each respiratory cycle.

2. A lung ventilator as claimed in claim 1, wherein said control means is operative such that said additional valve means is transferred to its open state at the beginning of the inspiratory phase after the closing of the expiration valve means and is transferred to its closed state at the end of the inspiratory phase before the opening of the expiration valve means.

3. A lung ventilator as claimed in claim 1, wherein said inspiratory gas conduit has an inlet separate from the outlet of the expirating gas conduit.

4. A lung ventilator as claimed in claim 1, comprising third valve means in said expiratory gas conduit between said gas volume measuring means and said additional valve means for preventing a gas flow from said gas volume measuring means to the ambient atmosphere through said additional valve means.

5. A lung ventilator as claimed in claim 4, wherein said third valve means is a check valve permitting a gas flow only in the direction from said expiration valve means to said gas volume measuring means.

6. A lung ventilator as claimed in claim 4, wherein said third valve means is controlled to open and close in synchronism with said expiration valve means.

* * * * *